W. H. BATTERSON.
IRONING MACHINE.
APPLICATION FILED JULY 9, 1919.
1,362,918.
Patented Dec. 21, 1920.
3 SHEETS—SHEET 3.
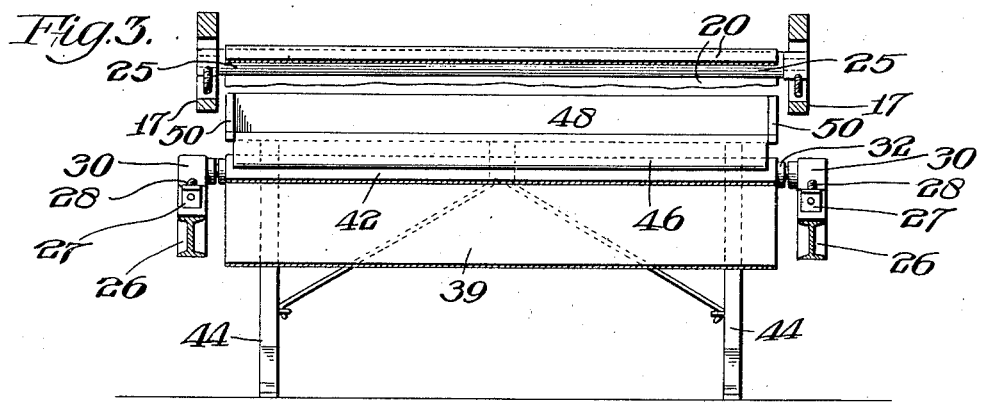
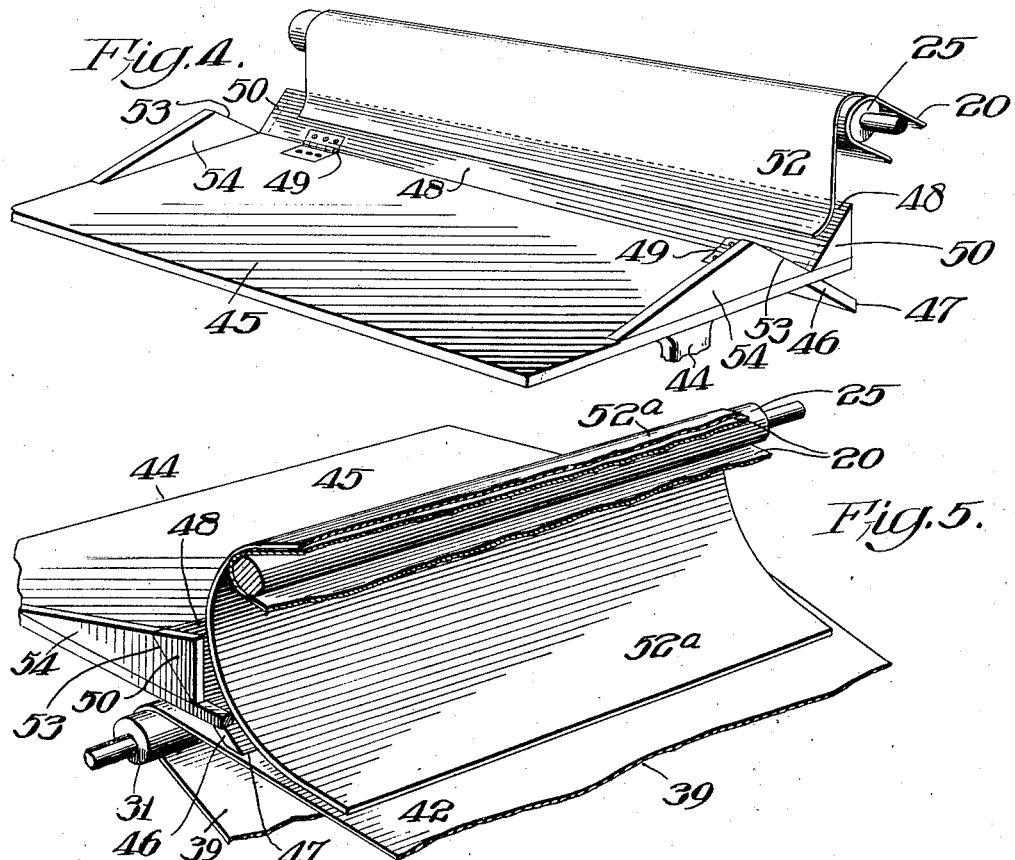
Witnesses:
Inventor
William H. Batterson
By Joshua R. H. Potts
Attorney

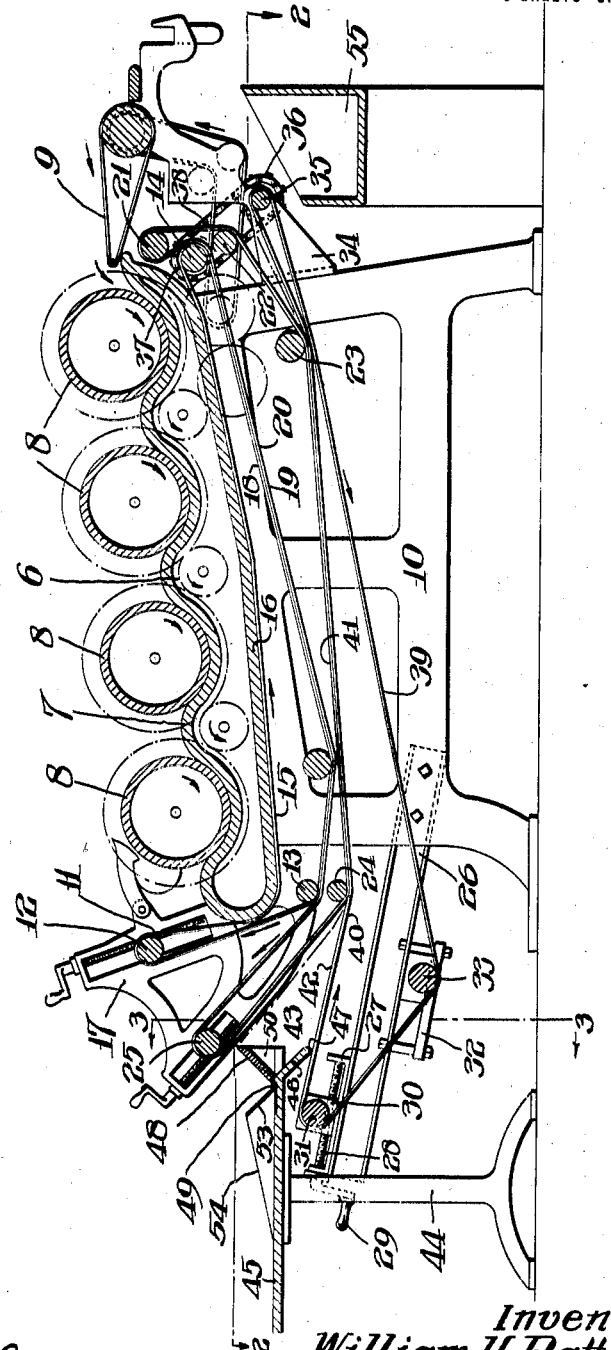

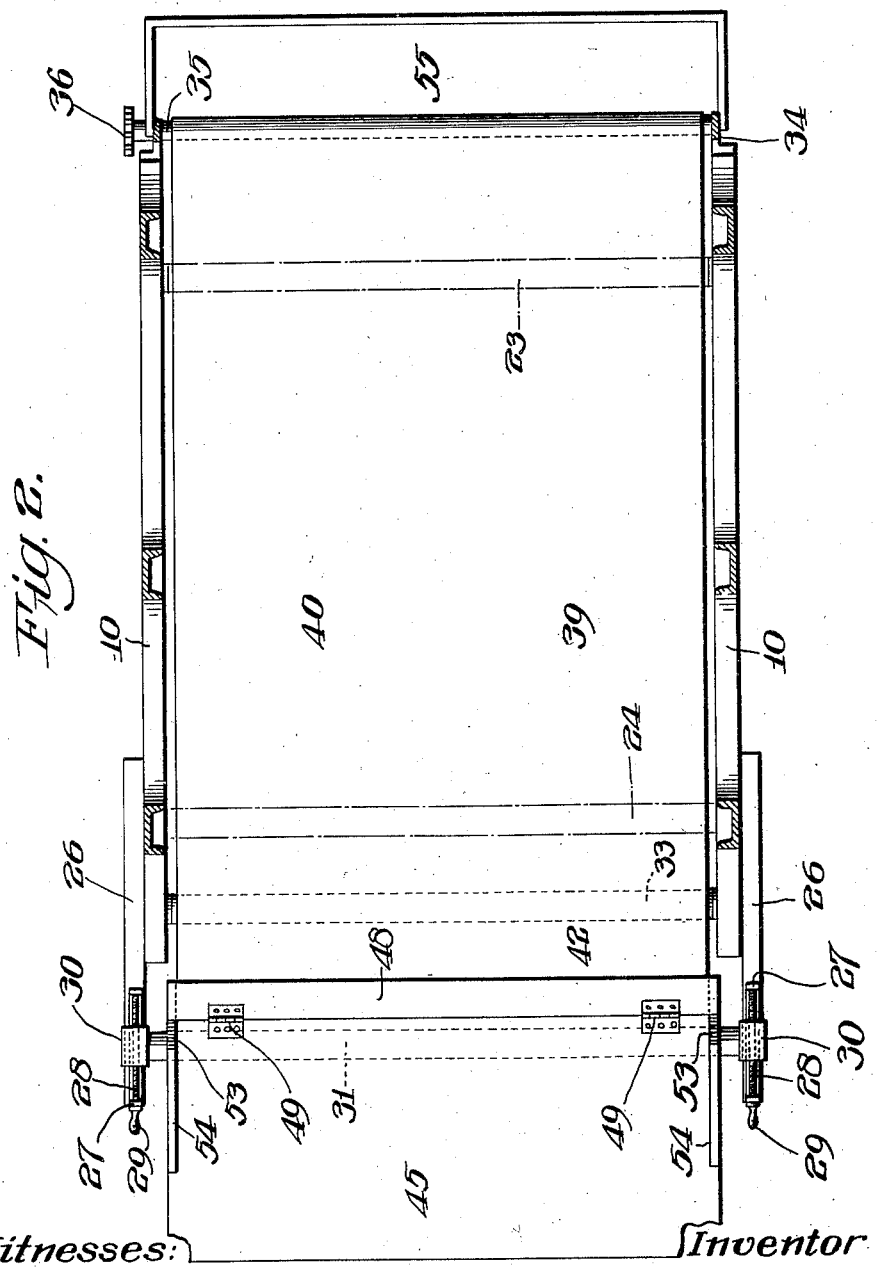

UNITED STATES PATENT OFFICE.

WILLIAM H. BATTERSON, OF PHILADELPHIA, PENNSYLVANIA.

IRONING-MACHINE.

1,362,918. Specification of Letters Patent. Patented Dec. 21, 1920.

Application filed July 9, 1919. Serial No. 309,729.

*To all whom it may concern:*

Be it known that I, WILLIAM H. BATTERSON, a citizen of the United States, residing at Philadelphia, in the county of Philadelphia and State of Pennsylvania, have invented certain new and useful Improvements in Ironing-Machines, of which the following is a specification.

During the operation of ironing machines of the type where articles to be ironed are inserted or fed in at one end of the machine and delivered at the opposite end, it is often necessary, for various reasons, to run the articles through the machines a number of times, such for example as when the articles are delivered in a creased condition, due to improper feeding or conveying of the articles through the machine or when the articles are thick, such as blankets and bed spreads, and therefore require more ironing than thinner articles. Prior to my invention in the use of long ironing machines where the work was fed into one end of the machine and delivered from the opposite end of the machine it was the usual custom, when it was necessary to run an article a second time through the machine, for the operators to carry the articles from the delivery end again to the feed end so that they could again be put through the machine. This consumed a great deal of time and often required the stopping of the entire machine while the articles were being carried from one end to the other. On large machines this manual carrying action was extremely laborious and often resulted in injury to the operators, since it was necessary for them to carry the articles along the side of the machine where numerous movable parts were located and unless great care was exercised on the part of the operators, the articles would become soiled while being carried.

One object of my invention is to provide means which will form a part of such machines and which will be operative to automatically return articles from the delivery end of an ironing machine to the feed end, whereby they can be again put through the machine without requiring that the operators at the opposite end of the machine leave their positions or without necessitating the stopping of the machine.

Another object is to so construct my invention that the returning means will deposit the returned article into a trough so as to be conveniently positioned for again putting them through the machine.

A further object is to so construct my invention that the articles while being returned from the delivery end to the feed end will be returned in flat condition while traveling toward the feed end so as not to further crease the articles while being returned.

A still further object is to make the parts of my invention in such manner that they can be easily adjusted and will be of a simple and durable construction.

These objects, and other advantageous ends which will be described hereinafter, I attain in the following manner, reference being had to the accompanying drawings in which—

Figure 1 is a longitudinal sectional elevation of an ironing machine including my invention, the same showing certain conveying belts or aprons in outside view, Fig. 2 is a sectional plan view taken on the line 2—2 of Fig. 1, Fig. 3 is a transverse sectional elevation taken on the line 3—3 of Fig. 1, Fig. 4 is a fragmentary perspective view showing an article having been ironed and passing onto a support which forms a part of my invention; the ironing of said article having been finished, and Fig. 5 is a fragmentary perspective view showing how my invention operates to automatically return an article, after having been passed through the machine, to the feed end of the machine so as to be again put through the machine.

Referring to the drawings, 6 represents a steam box or chest having a wave-like or undulated top 7. Rolls 8 operate in conjunction with the top of the steam box 6 in the usual manner to "iron" articles which are fed between the rolls and the top of the steam box after first being positioned on an apron conveyer 9; it being noted that the rotation of the rolls 8 serves to convey the articles over the top of the steam box in the usual manner. The steam box is supported on any suitable frame, such as shown at 10, and a flexible endless apron conveyer 11 passes over guide rolls 12 and 13 and a driving roll 14. One run 15 of the apron conveyer 11 is adapted to move in engagement with the bottom 16 of the steam box 6 and the guide roll 12 is adjustable in a bracket 17 so as to place tension upon the apron conveyer 11 so that when the articles, after being engaged by the rolls 8, engage the run 15 of the apron conveyer they will be conveyed in a flat condition between the roll 8 and the bottom of the steam box and will be again moved toward the feed end of the machine. This operation serves to thoroughly dry the articles in the usual manner, and after passing under the steam box, the articles will move between the lower run 18 of the apron conveyer 11 and the upper run 19 of another flexible endless apron conveyer 20. The apron conveyer 20 passes around guide rolls 21, 22, 23, 24 and 25, and also engages the apron conveyer 11 as it passes around the guide rolls 13 and the driving roll 14 so that the apron conveyer 20 takes the same movement as does the apron conveyer 11. The guide roll 24 is positioned below the guide roll 23 and the guide roll 25 is adjustably mounted in the bracket 17 so that tension can be applied to the apron conveyer 20 in the usual manner. The apron conveyer 20, from the rolls 13 and 24, extends rearwardly at an incline, as clearly shown in Fig. 1.

The elements above described form the part of a well known ironing machine and do not in themselves form a part of my present invention. My invention consists of a supplemental frame 26 which has brackets 27 mounted thereon, said brackets including adjusting screws 28 which can be rotated by handles 29. The screws 28 extend through slidable blocks 30, said blocks having tapped holes in which the screws 28 fit so that by turning the handles 29, the blocks can be slid longitudinally of the brackets. The blocks 30 form bearings for a roll 31. A hanger bearing 32 is secured to the supplemental frame 26 and supports a guide roll 33 at a lower level than the roll 31. The forward or feed end of the frame 10 has a bracket 34 thereon which provides a bearing for a guide roll 35; said guide roll having a sprocket 36 thereon which is operatively connected with a sprocket 37 on the roll 14 by a chain 38. An endless flexible apron conveyer 39 passes over the rolls 31, 33 and 35 and has its upper run 40 adapted to press against the lower run 41 of the apron conveyer 20. The top of the roll 31 is positioned above the level of the bottom of the guide roll 24 so that the portion 42 of the apron conveyer 39 inclines rearwardly from the guide roll 24 to the roll 31. The angle of incline of the portion 42 of the apron conveyer 39 is not as steep as the angle of the rear portion of the apron conveyer 20 so that there is a rearwardly flaring space 43 between the portion 42 of the apron conveyer 39 and the rear portion of the apron conveyer 20. A support 44, illustrated in the form of a table, has a top board 45 which includes an end portion 46 which slants downward and forward and is adapted to be positioned in the space 43, in such manner that the lower edge 47 of the portion 46 is directly above the portion 42 of the apron conveyer 39. The top 45 of the support has a plate or board 48 hinged thereto, as shown at 49, and this plate normally is supported as shown in Fig. 1 by end blocks 50 in a position which inclines from the top of the portion 46 forwardly and below the guide roll 25 of the apron conveyer 20. The blocks 50, when the plate 48 is in the above described position, are adapted to rest on the upper surface of the top 45 of the support 44, and the plate 48 serves as guiding means for deflecting the ironed articles as they pass upwardly on the rear portion of the apron conveyer 20 and then drop from the portion of the apron conveyer while passing around the roll 25; it being noted that after the articles pass between the bottom 16 of the steam box 6 and the run 15 of the apron conveyer 11 that they pass between the apron conveyer 11 and the run 19 of the conveyer 20 rearwardly toward the delivery end of the machine. This action is clearly shown in Fig. 4, and during the normal operation of the machine when it is necessary to run the articles through the machine but once, the plate 48 serves to deflect the articles, such for example as the article illustrated at 52, upon the top 45 of the support 44 where it can be removed.

When it is desired to return an article, after having passed through the machine, to the feed end, the plate 48 is swung rearwardly on its hinges until it strikes and rests upon rearwardly inclined edge surfaces 53 of flanges 54 which are supported on the top 45. When in this position, the plate 48 is in substantial alinement with the portion 46 and any article, such as the article 52$^a$ passing over the rear portion of the apron conveyer 20 will strike either the plate 48 or portion 46 and slide downwardly thereover upon the portion 42 of the apron conveyer 39, as clearly shown in Fig. 5. The upper run 40 of the apron 39 moves forwardly and conveys the article between it and the lower run of the apron conveyer 20, thereby keeping the article flat, and as the conveyers 30 and 39 continue to move, the article will pass forwardly and over the roll 35 into a receptacle 55 which is illustrated in the form of a trough; the articles after entering the trough can again be run through the machine by feeding them upon the apron conveyer 9 so as to again pass between the rolls 8 and the steam box 6.

By arranging the parts as above described, the plate 48 can be quickly moved either to cause the articles to be returned to the feed end or to permit the articles to be deposited upon the top 45 of the support 44.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An ironing machine including a conveyer for moving the ironed articles edgewise toward the delivery end of the machine; a second conveyer having a portion movable toward the feeding end of said machine; and means optionally rendered operative for intercepting said articles as they pass out of said delivery end of the machine and deflect them upon said portion of the second mentioned conveyer in a direction substantially parallel to the direction of movement of the latter; substantially as described.

2. An ironing machine including a conveyer for moving the ironed articles edgewise to the delivery end of the machine; a second conveyer having a portion spaced below the delivering part of said first conveyer and movable toward the feeding end of the machine; and a support positioned between said conveyers and adapted to receive said ironed articles from said first conveyer, said support having a portion adapted to be rendered operative to intercept and deflect said articles as they pass from said first conveyer upon said portion of the second conveyer; substantially as described.

3. An ironing machine including a conveyer for moving articles, after having been ironed, to the delivery end of the machine, said conveyer consisting of an apron having a portion movable toward the feed end of the machine; and a second conveyer consisting of an apron having a portion movable toward said feed end of the machine and traveling adjacent said portion of the first conveyer whereby articles from said first conveyer will be conveyed between said portions of the aprons to the feed end of the machine; substantially as described.

4. An ironing machine including a conveyer for moving articles, after having been ironed, toward the delivery end of the machine; a second conveyer positioned below said first conveyer and having a portion spaced from the rear portion of said first conveyer and movable toward the feeding end of the machine; and a support positioned between said portions of the conveyers, said support including a part positioned to deflect said articles onto said support, said part being positioned to deflect said articles from said first conveyer upon said portion of said second conveyer whereby they are moved to the feed end of the machine; substantially as described.

5. An ironing machine including a conveyer for moving articles, after having been ironed, toward the delivery end of the machine; a second conveyer positioned below said first conveyer and having a portion spaced from the rear portion of said first conveyer; a support positioned between said portions of the conveyers, said support including a downwardly and forwardly slanting portion; and a plate movable into a position to deflect articles from said portion of the first conveyer onto said support, said plate also being movable into a position to permit said articles to pass into engagement with said slanting portion of the support whereby they are guided onto said second conveyer and returned to the feed end of the machine; substantially as described.

6. An ironing machine including a conveyer for moving the ironed articles edgewise toward the delivery end of the machine; a second conveyer having a portion movable toward the feeding end of said machine; and means optionally rendered operative for initially intercepting the edges of said articles as they pass out of said delivery end of the machine and deflect them upon said portion of the second mentioned conveyer in a direction substantially parallel to the direction of movement of the latter whereby said articles are delivered upon said second mentioned conveyer in a substantially flat condition; substantially as described.

In testimony whereof I have signed my name to this specification in the presence of two subscribing witnesses.

WILLIAM H. BATTERSON.

Witnesses:
CHAS. E. POTTS,
ANNA RENTON.